June 27, 1939. H. S. LEVENSON 2,164,213
GLASS GREYHOUND STARTING BOX
Filed Dec. 20, 1935 3 Sheets-Sheet 1
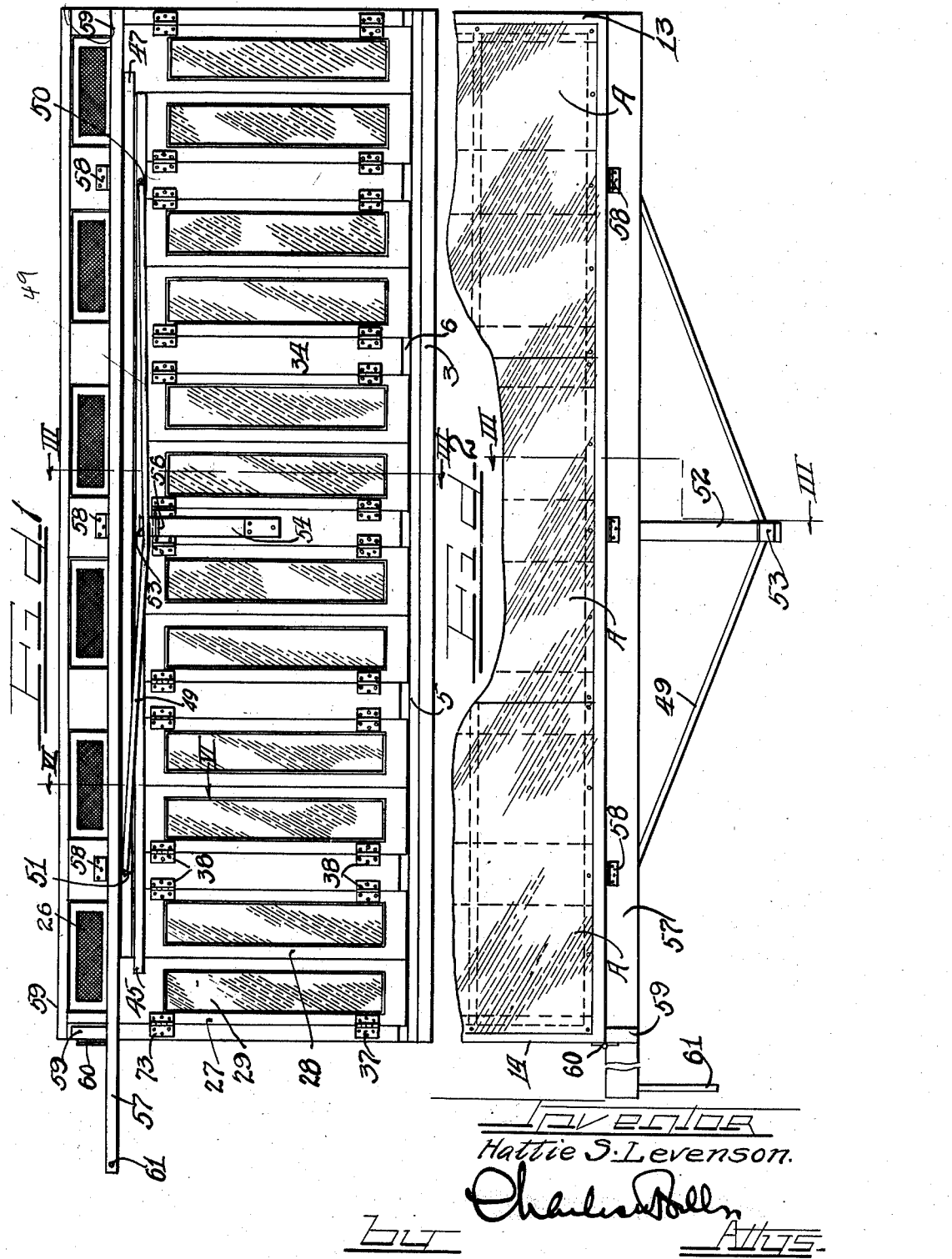
Inventor
Hattie S. Levenson.

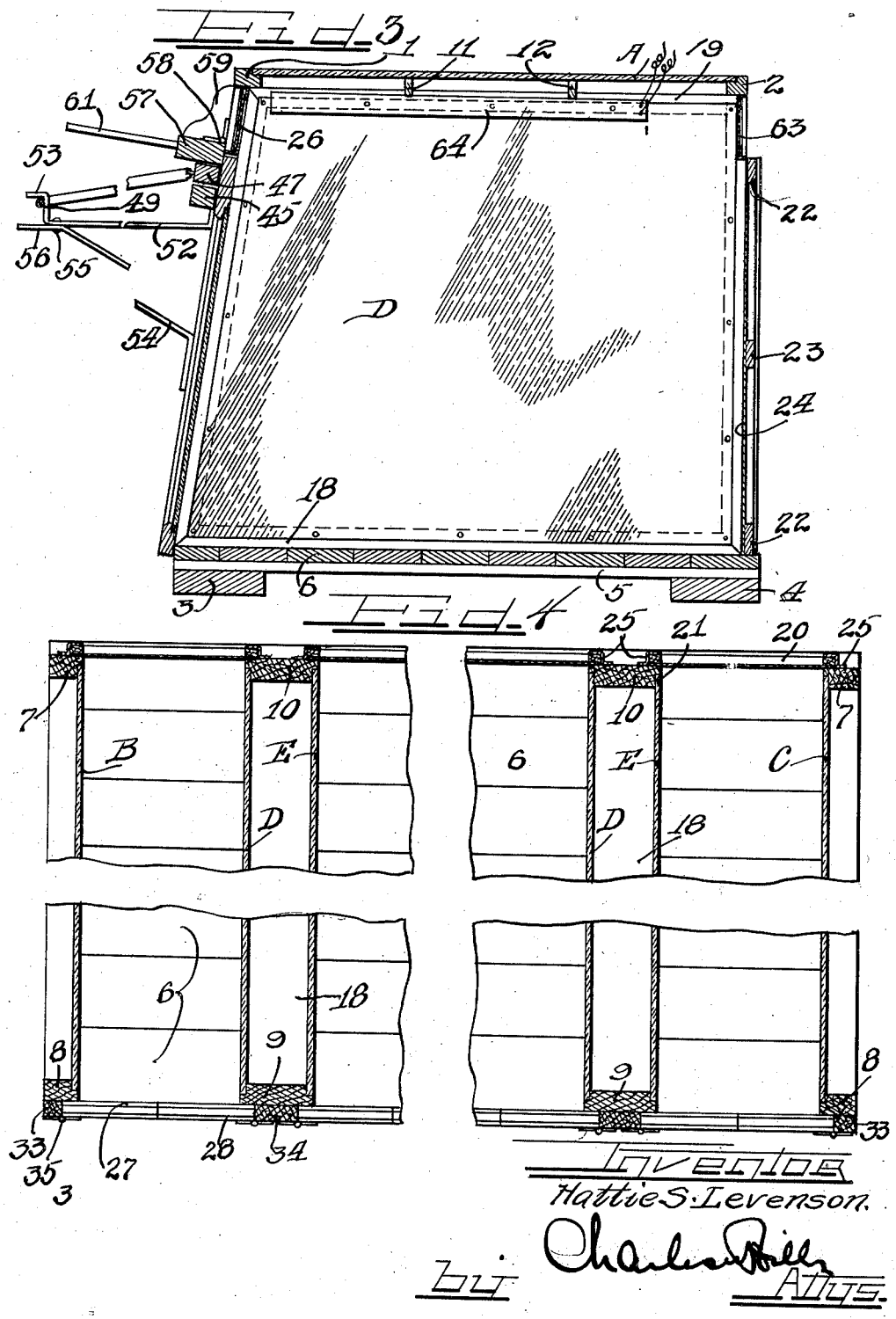

June 27, 1939. H. S. LEVENSON 2,164,213
GLASS GREYHOUND STARTING BOX
Filed Dec. 20, 1935 3 Sheets-Sheet 3
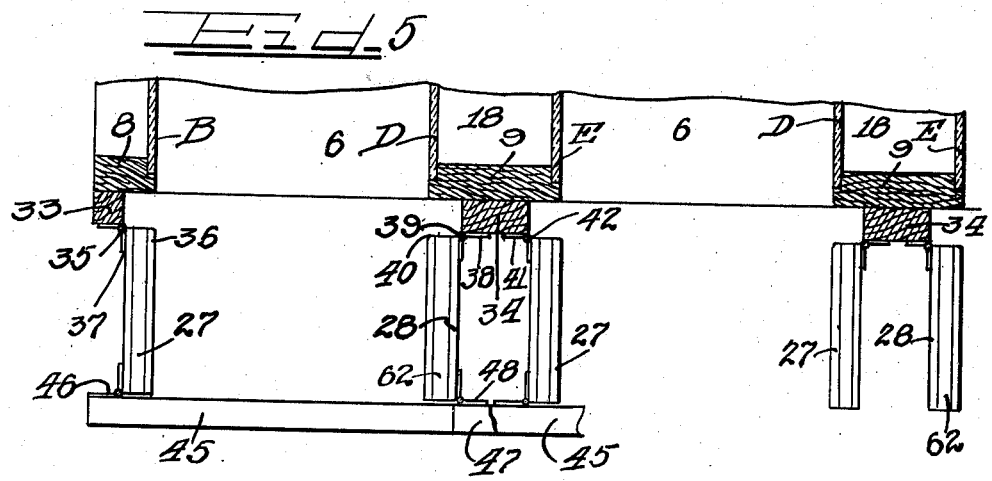
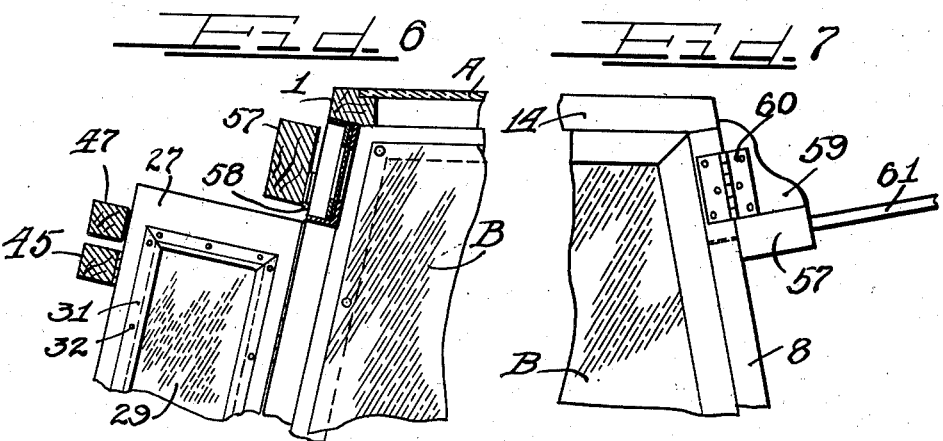
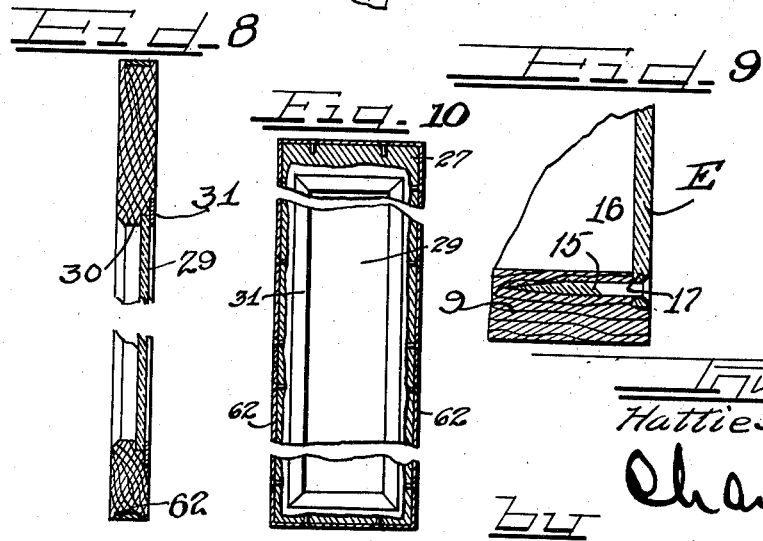
Inventor
Hattie S. Levenson Patented June 27, 1939

2,164,213

UNITED STATES PATENT OFFICE 2,164,213

GLASS GREYHOUND STARTING BOX

Hattie S. Levenson, Miami, Fla.

Application December 20, 1935, Serial No. 55,333

1 Claim. (Cl. 119—15.5)

The present invention relates to a glass greyhound starting box used in dog racing, to hold the dog racers preparatory to the start of a race.

It is usual, in dog races, to start several dogs at a time, sometimes as many as eight or ten, these dogs are placed in a starting box across the race course and released from the box at a given instant, usually as a traveling lure rushes past the box in the direction of the race.

The dogs are nervous, excitable, and always eager to go. Sometimes the dogs turn themselves around in their stalls in the boxes thus heading in the wrong direction and becoming handicapped when the box is opened for the start of the race. This is especially true where the boxes are so constructed where the dogs cannot see one another.

The present invention relates to a glass starting box having glass partitions, ends and top, together with glass panels in the doors, so that the dogs may be observed at all times, and also so that the dogs in the box may see one another. It has been found that when the dogs are able to see one another in a starting box, they become more eager to go and assume tense positions ready to spring, when the doors of the box are opened. The dogs are keyed up for a race when able to see one another, also when enabled to see the approaching lure, all of which adds to the interest of a race. The fact that the dogs may be readily observed while in the box prevents unscrupulous persons from putting the dogs in wrong end to, and also makes it possible for those in charge of the race to, at all times, have the dogs under observation.

An object of the present invention is to provide a glass starting box for dog races having transparent partitions and doors so constructed as to present smooth surfaces to prevent injury to the dogs.

Another object of the present invention is to provide a glass starting box with double walled partitions of transparent material to permit visibility from end to end of the box and at the same time prevent heat interchange from one stall to another.

A further object of the present invention is to provide a glass starting box having double walled partitions to prevent the outside temperature from materially affecting the temperature within the box. This feature is especially beneficial in warm climates, as it results in the interiors of the boxes being comparatively cool.

A still further object of the present invention is to provide improved glass greyhound starting box construction.

The above, other and further objects of the present invention will be apparent from the following description, accompanying drawings, and appended claim.

The accompanying drawings illustrate embodiments of the present invention and the views thereof are as follows:

Figure 1 is a front elevational view of a glass starting box constructed in accordance with the principles of the present invention.

Figure 2 is a fragmental top plan view of the box of Figure 1.

Figure 3 is a vertical transverse sectional view through the illustrated form of box taken substantially in the plane indicated by line III—III of Figure 2.

Figure 4 is a fragmental horizontal sectional view through the box.

Figure 5 is a fragmental horizontal sectional view through the front of the box showing the front doors in opened position.

Figure 6 is a fragmental vertical sectional view, taken substantially in the plane indicated by the line VI—VI of Figure 1, with the door in open position.

Figure 7 is a fragmental end elevational view looking at the left hand end of the box of Figure 1.

Figure 8 is a fragmental vertical section through one of the front doors of the present invention.

Figure 9 is a fragmental vertical sectional view through the lower portion of one of the double walled partitions showing the preferred manner of applying the glass in place.

Figure 10 is a vertical view with parts in plan and parts in section.

The drawings will now be explained.

The starting box comprises a skeleton frame including front and back stringers 1 and 2, at the top, longitudinally extending sills 3 and 4, at the bottom. Connecting the sills 3 and 4, at intervals, are cross pieces 5 which support floor boards 6, which boards extend the full length of the box. At each end of the frame uprights 7 and 8, at the back and front respectively support the stringers 2 and 1 in proper manner.

At intervals in the length of the frame structure are front and back uprights 9 and 10 respectively disposed in the length of the frame structure to define the partitions separating the interior of the box into a plurality of stalls or compartments.

There are intermediate longitudinally extending top braces 11 and 12 which are at their ends supported in the end stringers 13 and 14, in any suitable manner.

The inner margins of the stringers 1 and 2 are rabbeted to provide recesses for receiving glass top panels A, which panels rest on the intermediate supporting members 11 and 12 to prevent sagging of the panels. Preferably there are several of these panels used on the top of the box.

The inner margins of the uprights 7 and 8 are likewise rabbeted to receive an end glass panel B, at one end, and a panel C at the other end of the box.

Every pair of uprights 9 and 10 have rabbets on the opposite margins thereof to receive glass panels D and E. The panels D and E constitute a double walled partition with a dead air space between them.

The end panels B and C as well as the partition panels D and E are set into the rabbets with putty and secured in flush relationship with the margins of the various frame members, in the manner illustrated in Fig. 9.

In Fig. 9 one of the uprights 9 is shown with a panel E secured to it by means of a wood screw 15 which enters a countersunk hole 16 in the panel E. Preferably the countersunk hole 16 is slightly larger than the head of the screw 15 to receive a washer 17. Preferably the washer used is felt, so that the screw may be tightened against the glass without breaking the glass and at the same time assuring a tight fit of the glass against the frame members.

The various panels B, C, D and E, and the like, are secured in this manner. The panels may be set in putty in the rabbets, if desired.

Figure 3 illustrates the appearance of one of the partition panels when installed in the manner described.

As part of the partitions there are bottom members 18 and top members 19 in register, and these likewise are rabbeted to receive the bottom and top margins of the glass panels. The longitudinally extending intermediate members 11 and 12, for the top of the frame, are suitably connected to the top members 19 of the partitions.

Preferably the box is constructed, in end elevation, with its rear wall substantially vertical and its front wall sloping downwardly and outwardly from the top towards the bottom.

The several partitions define stalls in which the dogs are placed preparatory to the start of a race.

The several stalls have rear or entrance doors and front or exit doors.

Preferably the rear doors 20 are constructed with the usual stiles 21, rails 22 and intermediate rails 23 suitably secured together. The rear doors preferably have panels 24 of "masonite" or other suitable material, attached to the rails and stiles for completion. Above the rear doors are ventilating screens 63, of any suitable construction.

The rear doors 20 are arranged to slide vertically in Z-shaped guides 25 adjacent the rear uprights of the frame structure.

The front of the box is constructed with a plurality of screen ventilators 26 arranged immediately below the top of the box and above the upper margins of the front doors. These front ventilators, in connection with the screens in the rear, will assure proper ventilation of the box at all times.

The front end of every stall is provided with a pair of doors, indicated for convenience in description as left hand door 27 and right hand door 28. There are as many pairs of these doors as there are stalls in the box, there being six stalls illustrated in the accompanying drawings, although, of course, more or less stalls may be provided as desired or conditions warrant.

Every one of the front doors is provided with a large opening in which is seated a glass panel 29. Fig. 8 illustrates the details of construction of the front doors. It will be observed that the glass panel 29 is set into a rabbet 30, formed in the door structure, and held therein by a thin metallic retaining strip 31, secured in position by means of screws 32. The outer surface of the strip 31 is flush with the inner surface of the door so as to afford no projections or obstructions against which a dog may injure himself while moving about within a stall. The securing strip 31 may be made as a unitary rectangular structure if desired, or may consist of four separate parts, two for the sides, and one each for the top and bottom of the opening in the door. In any event the securing strip structure is of such nature as to afford no injury to a dog within a stall.

Secured to the front end uprights 8, of the frame structure are battens 33 which are narrower than the widths of the uprights 8. Secured to the uprights 9 of the several partition frame members are battens 34 which are of less widths than the uprights 9.

The left hand door 27 of the endmost stall at the left hand end of the box, as viewed in the figures of the drawings, is secured by hinges 37 to the batten 33. The pivotal pins 35 in the hinges are set back from the face of the adjacent end panel B a distance substantially that of the thickness of the door 27, so that when the door is opened, as may be observed in Fig. 5, the inner surface of the left hand door 27 is substantially flush with the end panel B of the box. Preferably the corner of the door, at the rear margin thereof, is rounded as at 36 to offer no sharp edge against which a dog might hurt himself as he leaps out of the stall.

In a similar manner the right hand door 28 is secured to the batten 34 by means of hinges 38 having the pivot pins 39 thereof spaced from the adjacent face of the panel D of the partition a distance substantially that of the thickness of the door 28, so that when the door is opened, its inner surface will be substantially flush with and coextensive with the surface of the partition wall D. In like manner the rear marginal corner of this door is rounded at 40 to prevent injury to a dog leaping out of the stall.

The left hand door 27 of the next stall is secured to its batten 34 by means of hinges 41 arranged with the pivot pins 42 set backwardly a distance from the glass panel E, of the partition, substantially that of the thickness of the door 27, so that the inner surface of the door 27 will be flush and co-extensive with the surface of the glass panel E of this partition.

In like manner the doors for the other stalls are arranged as described.

In order to open the front doors at the start of a race, it is necessary that these be opened simultaneously and quickly, as the dogs within the box are eager to go and many of them are crouched to spring the instant the doors are opened.

The illustrated form of operating the doors is as follows:

Extending along the front of the box is an operating bar 45 connected to all of the left hand doors 27 by means of hinges, as may be seen in Fig. 5. Other connections than hinges may be employed if desired.

For operating the right hand doors 28 another operating bar 47 extends along the front of the box, in vertically spaced relation with respect to the operating bar 45. The bar 47 is connected to all of the right hand doors 28 by hinges or similar means 48, as may be seen in Fig. 5.

For actuating the operating bars 45 and 47 to quickly open the doors of the several stalls, an elastic cord 49 is connected at one end as at 50 to the operating bar 45, and at the other end, as at 51 to the operating bar 47. In order to apply tension to the elastic cord 49, a bracket member 52 is secured at its inner end to a suitable portion of the frame structure of the box at substantially mid-length of the box, and has its outer end formed in the nature of a hook 53. A brace 54 secured at its inner end to the box frame, has its outer end fastened as by a rivet 55 to the bar 52 adjacent the hook. Preferably the extremity of the brace 54 extends outwardly of the rivet to form a shelf 56 to prevent the elastic cord 49 from being displaced when relaxed. Preferably the portion of the hook 53 which is engaged by the elastic cord 49 is curved to reduce friction and prevent wear on the cord in service.

The elastic cord 49 is so designed and connected as to tend to maintain the pairs of doors in open position, that is the position shown in Fig. 5.

In order to secure the pairs of doors in closed position, preparatory to the start of a race, a locking bar 57 is hingedly connected to the front of the box by hinges 58 so disposed as to rock the bar 57 about a horizontal axis. The bar 57 is hinged to the front of the box in such position that when the bar is swung down into locking position, it engages against the pairs of doors 27 and 28 along the upper margins thereof, as may be observed in Figs. 1 and 3. In this position the bar 57 locks the doors closed. The locking bar 57 is maintained in locking position by means of a swinging block 59 which is hinged, by means of a hinge 60 to one end of the box, the left end as shown in the drawings and as appearing in Figs. 1 and 7. When the locking bar 57 is in locking position, the block 59 is then swung to engage against the top side of the bar and prevent it from swinging upwardly away from locking position. The locking bar 57 is provided with a handle 61 for ease in manipulating the bar to closed position, and also for swinging it away from locking position.

The pairs of doors are moved to closed position by manually moving the actuating bars 45 and 47 to close the several pairs of doors whereupon the locking bar 57 is then rocked from the position of Fig. 6 to the position of Figs. 1 and 7 to lock the doors in closed position.

When the pairs of doors are moved to closed position the elastic cord 49 is put under tension and thereby becomes available to move the actuating bars 45 and 47 in direction to open the doors with snap action when the locking bar 57 is moved away from locking position. The connection of the pairs of doors to the actuating members in the manner described results in immediate opening of these doors simultaneously, so that the dogs in the box crouched and ready to spring may instantly leap from the stalls and participate in the race.

The construction of the box is such that the interiors of the stalls present smooth even surfaces to prevent injury to the contained dogs and are so constructed that there is nothing of any character whatsoever to injure the dogs in any manner, even though the dogs turn around in the stalls or endeavor to break out before the opening of the doors.

The hinging of the front doors 27 and 28, in the manner stated, results in the interiors of these doors being flush with the interiors of these stalls, and constituting extensions of such stalls when the doors are opened. Furthermore, such construction presents no obstructions which might be struck by the dogs leaping out of the stalls at the commencement of a race.

The front doors 27 and 28 have flat metallic bands 62 set into channels formed in the margins of the doors. These bands are preferably formed as two U-shaped members secured in position by means of screws or like instrumentalities. These bands serve to strengthen the doors against damage incidental to repeated openings in use.

The manner of securing the actuating bars 45 and 47 to the several front doors of the box limits the extent of movement of these doors in opening direction, as may be viewed in Fig. 5, as the hinged connection is such that the swinging movement of the doors is stopped when the bars rest against the front margins of the doors when moved to open position.

The glass preferably employed is wire glass, for strength, which is finished smooth on its exterior and of sufficient thickness to be serviceable for long periods of time.

It will be observed that the starting box of the present invention affords ready visibility of the dogs in the box at all times, and at the same time enables the dogs therein to see one another thus increasing the interest in the starting of the race.

The construction of the box is such as to eliminate all hazard of injury to the dogs so that there may be no accidental handicap to any dog because of injury received while in the box or at the moment of leaving it.

Preferably the floors of the several stalls are covered with corrugated rubber mats cemented in place. These mats afford footing for the dogs to enable them to spring out of the stalls without slipping, and also aid in maintaining the stalls in sanitary condition.

In order to provide visibility of the boxed dogs, for night racing, illuminating means, such as electric lights 64, are installed within the double walled partitions. Such manner of installation protects the lights from the dogs and vice versa.

The rollers with which such boxes are provided, for ease in moving the boxes onto and off of a racing track, are not shown, as they form no part of the present invention and are well known in the art.

The glass panels in the front doors are relatively large in comparison with the overall size of the doors. The securing strips 31 are relatively thin in comparison with their width.

It will be observed that the partitions comprise profile frames consisting of the front and back uprights 9 and 10 respectively, and the top and bottom members 19 and 18 respectively, and that the outer faces of the profile frames are rabbeted to receive the panels in flush relation with the outer surfaces of the frames.

The mode of operation of the starting box is as follows:

The box is arranged across a race course, the dogs are then loaded into the several stalls through the rear doors, the front doors, of course, being closed during the loading of the dogs. As the dogs are loaded, the rear doors are closed, thus caging the dogs with one dog to a stall. Because of the fact that the partitions are glass, the dogs can see one another and thus become eager to race. At the proper moment, which is when the traveling hare is moved past the box, the front doors are opened by raising the locking bar 57 by means of the handle 61. When the locking bar is raised, the elastic cord 49 then becomes active to open the doors, whereupon the dogs spring out of the box and start to race. As soon the dogs have left the box, it is withdrawn from the track in the usual manner.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

In a glass greyhound starting box, in combination, a skeleton frame, means constituting partitions defining a plurality of stalls in said box, pairs of doors for said stalls, an actuating bar connected to the left hand doors of said pairs, a second actuating bar connected to the right hand doors of said pairs, a single elastic cord connected at its ends to said bars and operative to move said bars in directions to open the doors, means engaging the mid-length of said cord outwardly of the front face of the box to tension said cord, a locking bar movable against all of said doors when closed to hold said doors closed against the tension of said cord, and a hinged stop engaging said locking bar for holding it in locking position against said doors.

HATTIE S. LEVENSON.